United States Patent [19]

Wenzel et al.

[11] 4,211,683

[45] Jul. 8, 1980

[54] PROCESS FOR THE PREPARATION OF AQUEOUS DISPERSIONS OF POLYURETHANES

[75] Inventors: Wolfgang Wenzel; Dieter Dieterich, both of Leverkusen, Fed. Rep. of Germany

[73] Assignee: Bayer Aktiengesellschaft, Leverkusen, Fed. Rep. of Germany

[21] Appl. No.: 821,268

[22] Filed: Aug. 3, 1977

[30] Foreign Application Priority Data

Aug. 21, 1976 [DE] Fed. Rep. of Germany ....... 2637690

[51] Int. Cl.$^2$ .................. C08L 61/28; C08L 75/12
[52] U.S. Cl. .................. 260/29.4 R; 260/29.2 TN; 525/443; 525/455; 525/456; 528/59; 528/71
[58] Field of Search ................... 260/29.2 TN, 29.4 R

[56] References Cited

U.S. PATENT DOCUMENTS

| | | | |
|---|---|---|---|
| 3,242,230 | 3/1966 | Habib | 260/29.2 TN |
| 3,491,067 | 1/1970 | Sellet | 260/29.2 TN |
| 3,756,992 | 9/1973 | Dieterich | 260/29.2 TN |
| 3,796,678 | 3/1974 | Bartizal | 260/29.2 TN |
| 3,905,929 | 9/1975 | Noll | 260/859 R |
| 3,920,598 | 11/1975 | Reiff et al. | 260/29.2 TN |
| 4,039,517 | 8/1977 | Hamamura et al. | 260/29.2 TN |

Primary Examiner—Murray Tillman
Assistant Examiner—Arthur H. Koeckert
Attorney, Agent, or Firm—Gene Harsh; Aron Preis

[57] ABSTRACT

The present invention relates to a process for the preparation of aqueous dispersions or solutions of polyurethanes which have urea end groups and contain nonionic hydrophilic segments and which are capable of being cross-linked with the aid of cross-linking agents which are reactive with urea groups, characterized in that prepolymers which have isocyanurate end groups and which (i) have an average molecular weight of less than about 15,000 and (ii) contain from about 2 to 30%, by weight, of ethylene oxide units corresponding to the following formula:

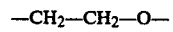

within a polyether chain (containing ethylene oxide units)

are reacted at from about 10° to 70° C. with an aqueous solution of ammonia or with a primary amine, optionally dissolved in water, the aqueous solution of ammonia or the primary amine, optionally dissolved in water, being added to the prepolymer in the reaction vessel and the quantity of water used for dissolving the ammonia or primary amine being not more than about 10%, by weight, based on the total quantity of reaction mixture, and finally, after termination of the addition reaction between the free isocyanate groups of the prepolymer and the added ammonia or primary amine, the reaction product obtained is stirred with water at from about 10° to 70° C. to form an aqueous dispersion or solution having a concentration of from about 5 to 65%, by weight. The present invention also relates to the use of dispersions or solutions obtainable by the process according to the present invention for the production of cross-linked sheets by application of the dispersion to a substrate and drying, cross-linking of the sheet being ensured by the addition of a cross-linking agent capable of undergoing a cross-linking reaction with the urea groups either before, during or after application of the solution or dispersion to the substrate.

9 Claims, No Drawings

PROCESS FOR THE PREPARATION OF AQUEOUS DISPERSIONS OF POLYURETHANES

FIELD OF THE INVENTION

This invention relates to a new process for the preparation of aqueous dispersions or solutions of polyurethanes which are capable of being cross-linked and to the use thereof for the production of cross-linked sheets.

BACKGROUND OF THE INVENTION

Processes are already known for the preparation of stable, aqueous polyurethane-polyurea dispersions (e.g. German Patent Nos. 1,184,946 and 1,178,586, German Auslegeschrift No. 1,237,306 and German Offenlegungschrift Nos. 1,495,745; 1,595,602; 1,770,068; 2,019,324 and U.S. Pat. Nos. 3,388,087, 3,480,592, 3,461,103, 3,479,310, 3,756,992, 3,686,108 and 3,905,929; see also D. Dieterich et al, Angew.Chem. 82,53 (1970)). The described dispersions are based on the principle of building hydrophilic centers into a macromolecular chain of a polyurethane (polyurea) molecule. The hydrophilic centers or so-called "internal emulsifiers" in these known dispersions are segments which have ionic groups or ethylene oxide groups. These hydrophilic centers are either built into the prepolymer in the form of certain diols or used as modified amines for chain lengthening the prepolymers which always have at least two isocyanate end groups.

Various processes may be used for preparing the known dispersions and have been described, for example, in D. Dieterich and H. Reiff, Angew. makromol. Chemie 26,85 (1972). As a general rule, a solution of a polyurethane in an organic solvent is either converted into an aqueous dispersion or a liquid prepolymer stage is dispersed in water, either with or without solvent. For example, a liquid prepolymer ionomer containing isocyanate groups may be introduced into water with vigorous stirring. In that case, an emulsion of the prepolymer is initially formed which undergoes further reaction with water or a diamine or polyamine under conditions of chain-lengthening to form the high molecular weight polyurethane urea.

One method of dispersion which is particularly simple to carry out has been described in German Offenlegungsschrift No. 1,913,271 (or U.S. Pat. No. 3,756,992). According to this method, a solid or liquid polyurethane polyelectrolyte which is capable of undergoing addition with formaldehyde to form methylol groups is dispersed by mixing it with water and is converted into a methylol group containing polyurethane polyelectrolyte by the addition of formaldehyde or a formaldehyde derivative. The polyurethane polyelectrolyte is then condensed to form the high molecular weight polyurethane either in the dispersion or on a substrate.

To bring about dispersion, water is added to the stirrable melt until it forms the continuous phase. The system generally passes through the stage of a water-in-oil emulsion before this is achieved. Alternatively, a water-in-oil emulsion may be prepared at elevated temperature, this emulsion changing into an oil-in-water emulsion on cooling. Preparation of the dispersion is generally carried out at elevated temperatures, preferably at from about 50° to 120° C. This is necessary, firstly because the prepolymer stage which is to be dispersed is too highly viscous at room temperature so that expensive apparatus, such as screw extruders would be necessary for dispersion, and, secondly because the rate at which dispersion progresses generally increases with increasing temperature. Dispersion of solvent-free melts of isocyanate prepolymers is also generally carried out at elevated temperatures.

Although the method described above is economically very advantageous when compared with the preparation of dispersions from solutions and may be carried out by simple means, it does not satisfy all practical requirements. Non-ionic dispersions are difficult or even impossible to prepare by this method because the dispersibility of preliminary stages of polyurethanes which contain hydrophilic polyether groups instead of ionic centers decreases with increasing temperature. This means that the compounds must be rendered more hydrophilic if they are to be dispersed at the desired elevated temperatures than is necessary for the subsequent stability of the dispersion. This means that the water-resistance of the products is deleteriously affected. On the other hand, the preparation of polyurethanes modified by hydrophilic ether groups would be particularly desirable because such dispersions have high resistance to electrolytes and to frost.

The conventional ionomer dispersions are generally insufficiently stable to electrolytes and to frost so that storage and transport during cold weather are expensive because they require heated storage rooms.

It has now surprisingly been found that non-ionic dispersions which contain hydrophilic polyether groups built into the molecule as emulsifier and which are capable of being cross-linked may be prepared very simply and without the aid of solvents if prepolymers containing isocyanate end groups and having a molecular weight of below about 15,000 and containing from about 2 to 30%, by weight, of ethylene oxide units arranged within a polyether chain are reacted with ammonia or primary amines under particular conditions which will be defined in detail below and the major proportion of the water required for dispersion or solution is then added.

Although an indication is given in U.S. Pat. No. 3,756,992 (column 18, lines 25-38) that ionic prepolymers having isocyanate end groups may be converted by reaction with ammonia or primary amines into the corresponding ionic adducts which are dispersible in water and which contain urea groups capable of being cross-linked, it has hitherto always been considered necessary to introduce the amine into the reaction vessel first or to add it very rapidly in stoichiometric excess with vigorous mixing in order to prevent unwanted chain lengthening and hence unwanted increase in viscosity.

At first, it seemed impossible to apply this principle to polyurethanes which contained non-ionic hydrophilic centers because all attempts to do so failed. Thus, the attempt to add isocyanate prepolymers to ammonia or primary amines in the reaction vessel was as unsuccessful as the attempt to reduce the reactivity of ammonia by converting it into ammonium carbonate. The desired result was, however, achieved quite unexpectedly by the addition of aqueous ammonia or the addition of primary amines optionally dissolved in water to non-ionic modified isocyanate prepolymers. The success of this experiment was completely surprising since a large excess of isocyanate was present at least at the beginning of the addition of ammonia solution or of amine so that the unwanted chain lengthening reactions between the isocyanate prepolymer and the ammonia or primary amine which was quite uninhibited in its reactivity was to be expected.

SUMMARY OF THE INVENTION

The present invention thus relates to a process for the preparation of aqueous dispersions or solutions of polyurethanes which have urea end groups and contain non-ionic hydrophilic segments and which are capable of being cross-linked with the aid of cross-linking agents which are reactive with urea groups, characterized in that prepolymers which have isocyanate end groups and which (i) have an average molecular weight of less than about 15,000 and (ii) contain from about 2 to 30%, by weight, of ethylene oxide units corresponding to the following formula:

within a polyether chain (containing ethylene oxide units) are reacted at from about 10° to 70° C. with an aqueous solution of ammonia or with a primary amine, optionally dissolved in water, the aqueous solution of ammonia or the primary amine, optionally dissolved in water, being added to the prepolymer in the reaction vessel and the quantity of water used for dissolving the ammonia or primary amine being not more than about 10%, by weight, based on the total quantity of reaction mixture, and finally, after termination of the addition reaction between the free isocyanate groups of the prepolymer and the added ammonia or primary amine, the reaction product obtained is stirred with water at from about 10 to 70° C. to form an aqueous dispersion or solution having a concentration of from about 5 to 65%, by weight.

The present invention also relates to the use of dispersions or solutions obtainable by the process according to the present invention for the production of cross-linked sheets by application of the dispersion to a substrate and drying, cross-linking of the sheet being ensured by the addition of a cross-linking agent capable of under-going a cross-linking reaction with the urea groups either before, during or after application of the solution or dispersion to the substrate.

DETAILED DESCRIPTION OF THE INVENTION

The process according to the present invention has the following advantages over the known processes: 1. It enables frost-resistant and electrolyte-resistant dispersions which contain hydrophilic polyether groups corresponding to the following formula: —CH$_2$—CH$_2$—O—to be obtained by a simple method without the aid of solvents or expensive dispersing apparatus. 2. The process may be carried out at room temperature or moderately elevated temperatures. 3. Since the reaction of the prepolymer which has been rendered hydrophilic preferably takes place in the presence of water, the viscosity remains sufficiently low in spite of the low reaction temperature; moreover, the water is homogeneously absorbed by the reactive mass and acts as plasticizer. 4. There is no risk of premature cross-linking or gel formation.

The prepolymers to be used in the process according to the present invention have an average molecular weight of less than about 15,000, preferably less than about 10,000, most preferably from about 1,000 to 5,000, and contain from about 2 to 30%, by weight, preferably from about 6 to 20%, by weight, of hydrophilic ethylene oxide segments corresponding to the formula: —CH$_2$—CH$_2$—O—built into polyether chains. They also contain at least two terminal isocyanate groups and the isocyanate content of the prepolymers is preferably from about 1.5 to 10%, by weight. Finally, the prepolymers may contain up to about 18 milli-equivalents, in particular up to about 10 milli-equivalents, of ionic groups per 100 g, in particular the following ionic groups: —COO$\ominus$, —SO$_3\ominus$, =N$\oplus$=, although in the process according to the present invention it is preferred to use prepolymers containing only non-ionic hydrophilic centers.

Preparation of the isocyanate prepolymers may be carried out in known manner by reacting excess quantities of simple organic diisocyanates such as hexamethylene diisocyanate, 4,4'-diphenylmethane diisocyanate, 2,4-diisocyanatotolune or 1-isocyanato-3,3,5-trimethyl-5-isocyanatomethylcyclohexane, with suitable compounds which have hydrogen atoms capable of reacting with isocyanate groups, in particular compounds at least two hydroxyl groups. In this reaction between the simple diisocyanates and the reactants containing active hydrogen atoms, the components are generally used in such proportions that from about 1.1 to 2.5 isocyanate groups are available per active hydrogen atom.

The compounds which may be reacted with the isocyanates include, for example, any of the polyhydroxyl compounds known in polyurethane chemistry, for example, polyhydroxyl compounds having a molecular weight of from about 62 to 200, e.g. ethylene glycol, butane-1,4-diol, hexane1,6-diol, glycerol or trimethyl propane; it is preferred, however, to use polyhydroxy polyesters or polyhydroxy polyethers having molecular weights of from about 200 to 8,000, preferably from about 1,000 to 5,000, for example, those mentioned in U.S. Pat. No. 3,756,992, line 29 of column 5 to line 6 of column 6, incorporated herein by reference.

It should be particularly mentioned that trifunctional and polyfunctional reactants may also be used in the process according to the present invention, branched prepolymers being thereby formed. Since the molecular weight must be below about 15,000, preferably below about 10,000, premature cross-linking is not likely to take place even when this procedure is employed.

The ethylene oxide segments in the isocyanate prepolymers, which are an essential feature of the present invention, may be constituents of known polyether polyols which may have been used in the preparation of the prepolymers and which are themselves formed if ethylene oxide is used as all or part of the alkylene oxide component in the preparation of polyether polyols by alkoxylation of suitable starter molecules.

However, the ethylene oxide units, which are an essential feature of the present invention, are preferably introduced into the prepolymer by using diols which have polyalkylene oxide side-chains according to German Offenlegungsschrift No. 2,314,512 (U.S. Pat. No. 3,905,929) and/or by using diisocyanates containing polyalkylene oxide side-chains according to German Offenlegungsschrift No. 2,314,513 (U.S. Pat. No. 3,920,598) in the synthesis of the prepolymers.

However, for the sake of completeness, it should be added to the above-mentioned publications that, instead of the described diols or diisocyanates containing side-chain polyethylene oxide units, it is also possible to use diols or diisocyanates in which the polyalkylene oxide side-chain contains other alkylene oxide units in addition to polyethylene oxide units, in particular, propylene oxide units. The only essential condition is that the quantity of ethylene oxide units should be sufficient to ensure that the resulting prepolymer contains the proportion of ethylene oxide units indicated above.

The particularly preferred non-ionic hydrophilic components used in the process according to the present invention correspond to the following general formula:

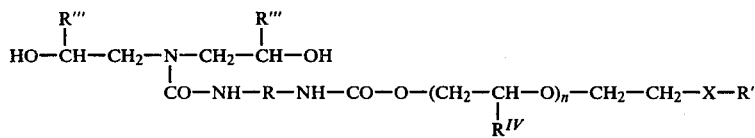

wherein

R represents a divalent group such as is obtained by removal of the isocyanate groups from a diisocyanate having a molecular weight of from about 112 to 1,000;

X represents $-O-$ or $-NR''-$;

R' and R" which may be the same or different, each represents a monovalent hydrocarbon group having from 1 to 12 carbon atoms;

R''' represents hydrogen or a monovalent hydrocarbon group having from 1 to 8 carbon atoms;

n represents an integer of from 4 to 89; and $R^{IV}$ represents hydrogen or may also (in accordance with the above description) represent a methyl group.

As mentioned above, another method of introducing ethylene-glycol ether segments consists of including polyethers having the appropriate number of such segments in the reaction mixture. Ethers which are monofunctional in their reaction with isocyanate groups may also be used as all or part of the hydrophilic chain breaking agent, provided the resulting prepolymer then still has at least two isocyanate groups.

Preparation of the prepolymer to be used in the process according to the present invention is otherwise carried out by known methods for example those described in U.S. Pat. Nos. 3,756,992; 3,905,929 and 3,920,598, incorporated herein by reference.

The average molecular weight of isocyanate prepolymers mentioned above is the molecular weight calculated from the stoichiometric relations of the reaction.

When carrying out the process according to the present invention, the isocyanate prepolymer is preferably introduced into the reaction vessel as a solvent-free melt at a temperature of from about 10° to 70° C., preferably from about 15° to 50° C., and an aqueous solution of ammonia or a primary amine, optionally dissolved in water, is added thereto. The proportions of the reactants are preferably chosen so that the reaction mixture contains from about 0.9 to 1.2, preferably from about 0.95 to 1.1, molecules of ammonia or of amino groups of the primary amine for each isocyanate group of the prepolymer melt.

Aqueous solutions are generally used when ammonia or gaseous primary amines, such as methylamine or ehtylamine, are used. Liquid primary amines, such as ethanolamine, may also be stirred into the prepolymer melt undiluted. In this reaction of isocyanate prepolymer with ammonia or primary amine, the quantity of water must not exceed about 10%, by weight of the total reaction mixture. The major quantity of water must not be added before the reaction between isocyanate groups and ammonia or primary amine has been completed. In this case also the temperature is maintained at from about 10° to 70° C., preferably from about 15° to 50° C.

Suitable primary amines include all organic compounds which have a primary amino group and are free from any other groups comparable with primary amino groups in their reactivity with isocyanate groups. Simple primary monoamines, such as methylamine, ethylamine, n-propylamine, m-hexylamine, aniline, ethanolamine or propanolamine, are preferably used. Since the amino group in the last-mentioned amino alcohols is much more reactive with isocyanate groups than the hydroxyl group also present, virtually no chain lengthening reaction takes place.

The polyurethanes containing urea and groups obtained after the reaction with ammonia or amines are generally diluted with the quantity of water required to adjust the solids content of the resulting dispersion to from about 5 to 65%, by weight, preferably from about 20 to 50%, by weight.

The products according to the present invention obtained in this way are generally dispersions in water, but if they contain a high proportion of hydrophilic groups they may also be solutions of polyurethanes in water.

The polyurethanes dispersed or dissolved in water contain urea groups which are capable of being cross-linked, in particular at the chain ends, and they may, therefore, be converted into cross-linked products by reaction with suitable cross-linking agents.

The most suitable cross-linking agents are aqueous solutions of formaldehyde, aqueous solutions of formaldehyde donors, in particular substances such as para-formaldehyde, trioxane, methylol hexamethylene tetramine, or oligo-methylol compounds, such as the dimethylol and oligomethylol derivatives of ureas, hexahydropyrimidones, urones and melamines, as well as other triazine derivatives. Methylol ethers may also be used.

Apart from formaldehyde, there may also be used higher aldehydes, such as acetaldehyde, chloral, crotonaldehyde, acrolein, furfural, glyoxal or glutaric acid dialdehyde, or ketones, such as acetone, methylethylketone or cyclohexanone or the condensates thereof with compounds which form aminoplasts or mixed condensates with formaldehyde and compounds which form aminoplasts.

Aqueous formaldehyde is the preferred cross-linking agent.

When used for the purposes of the present invention, the cross-linking agents of the type exemplified above are generally stirred into the aqueous dispersion or solution before its application. If desired, however, the cross-linking agent may also be applied together with the dispersion, for example, by means of two-component mixing devices, or it may be applied after application of the dispersions or solutions, for example gaseous formaldehyde may be applied to substrates which have been coated with the dispersions or solutions.

If, according to a preferred embodiment of the present invention, the cross-linking agent, for example aqueous formalin solution, is added to the dispersions or solutions obtained according to the present invention, it is often advisable to subject the resulting mixture to a heat treatment which consists of exposing the mixture for some time, for example for a period of from about 10 minutes to 48 hours, to an elevated temperature of from about 50° to 70° C. The duration of the heat treatment depends on the temperature and the pH. At pH values of from about 5 to 7 and temperatures of from about 50° to 70° C., it is generally necessary to continue the heat treatment for from about 10 minutes to 48 hours, whereas at a pH of 2 (adjusted, for example, by addition of suitable quantities of weak or medium acids, such as tartaric acid or phosphoric acid) about 10 minutes may be sufficient to product the desired degree of cross-linking of the polyurethanes dissolved or dispersed in water before the water is removed.

This heat treatment is particularly necessary if the drying of the dispersion is to be carried out at room temperature and subsequent heating is not possible, for example when the products are used for painting the outside of buildings.

In addition to or instead of this measure, the dispersions may be dried at elevated temperatures in combination with the cross-linking agents. Temperatures below about 100° C. are preferred for this method on account of the risk of the formation of blisters or bubbles. The dispersions are in most cases previously adjusted to pH values of from about 2 to 5, preferably from about 3 to 4, if they are not subsequently to be heated at elevated temperatures. This method is particularly suitable for continuously coating, laminating, bonding or lacquering where drying is carried out relatively rapidly in a drying channel.

If desired, the dispersions may, of course, be converted into substances having a gel-like consistency by the addition of thickeners or fillers or the like or by increasing the solids content and may then be mixed, for example with a melamine resin and cross-linked by heating after they have been applied as coatings.

One particular advantage of the process according to the present invention is to be seen in the simple and economical method of preparing the non-ionic dispersions which could not previously be prepared solvent-free by the method of dispersing melts. The dispersions obtained are distinguished by their resistance to electrolytes and frost. The polyurethane (urea) dispersions prepared by the process according to the present invention may be used in numerous fields of application. For example, they may be used for dressing leather or for coating various materials including textiles. In this case, they may, for example, be used as top coat or finish. Important fields of application also include the use of the products as adhesives or lacquers. Other possibilities of use lie, for example, in the fields of glass fiber sizes, dispersing agents, and impregnations for fibers and textiles. The products should also be regarded as additives for synthetic resin dispersions or as binders, e.g. for cork powder or sawdust, glass fibers, asbestos, paper products, plastics and rubber waste and ceramic materials.

Deionized water is used in the Examples which follow.

EXAMPLES

EXAMPLE 1

Reaction mixture 372 g of a polyester of phthalic acid, adipic acid and ethylene glycol (PAA) (OH No. 66)
135 g of dispersing agent (A)
73.3 g of hexamethylene-1,6-diisocyanate (H)
18.9 g of ammonia (25% in water)
890 g of water
35 g of formaldehyde (30% in water)

Dispersing Agent (A)

N,N-diethanolamine is chemically added to the reaction product of a polyethylene oxide polyether which has been started on butanol and contains about 17% of polypropylene oxide groups and hexamethylene-1,6-diisocyanate (NCO/OH=2:1) (NCO/NH of addition product=1:1). The molecular weight of the addition product is 2250. Its ethylene oxide content is about 77%, by weight.

Method

The polyester (PAA) and dispersing agent (A) are dehydrated. The diisocyanate (H) is stirred in at 80° C. The mixture is left to react at this temperature until its isocyanate content is 2.0%. It is then cooled to 60° C. and aqueous ammonia is stirred into the melt. Water is added after the ammonia solution has been thoroughly stirred in. Formaldehyde is stirred in 10 minutes after the addition of water. The dispersion according to the present invention obtained in this way, which contains cross-linking agent, is resistant to centrifuging and has a viscosity measured in a Ford cup (4 mm) equivalent to 51.0 seconds and a solids content of 32%. The pH is 5. The proportion of ethylene oxide units in the solid content is 17.5%, by weight.

EXAMPLE 2

Reaction Mixture 372 g of a polyester of phthalic acid, adipic acid and ethylene glycol (PAA) (OH No. 66)
67.5 g of dispersing agent (B)
62.7 g of hexamethylene-1,6-diisocyanate (H)
17.8 g of ammonia (25% in water)
1180 g of water
90 g of formaldehyde (30% in water)

Dispersing Agent (B)

N,N-diethanolamine is chemically added to the reaction product of a polyethylene oxide polyether which has been started on butanol and hexamethylene-1,6-diisocyanate (NCO/OH=2:1) (NCO/NH of addition product=1:1). The molecular weight is 2250. The ethylene content is about 89%, by weight.

Method See Example 1

A stable dispersion containing cross-linked agent is obtained. It has a solids content of 28% and an outflow time (DIN-cup/4 mm nozzle) of 11.7 seconds. The dispersion is suitable for use as primer additive for dressing leather. The proportion of ethylene oxide groups in the solid content is 11.1%. The calculated average molecular weight is 3871.

EXAMPLE 3

Reaction Mixture 372 g of a polyester of phthalic acid, adipic acid and ethylene glycol (PAA) (OH No. 66)

45 g of dispersing agent (A) (see Example 1)

59.7 g of a propoxylated adduct of 2-butenediol-(1,4) and $NaHSO_3$ (molecular weight 457 (AD), 77% in toluene)

85.4 g of hexamethylene-1,6-diisocyanate (H)

23.1 g of ammonia (25% in water)

1200 g of water 50 g of formaldehyde (30% of water)

Method See Example 1

A dispersion containing cross-linking agent is obtained which is resistant to centrifuging and has a solids content of 30%. It is suitable for use as primer additive for dressing leather. The proportion of ethylene oxide groups is 6.09%. It contains 17.5 m equivalents of $SO_3^{\ominus}/100$ g of solids content. The average molecular weight of the uncrosslinked oligourethane is 3255.

EXAMPLE 4

Reaction Mixture 372 g of a polyester of adipic acid, phthalic acid and ethylene glycol (PAA) (OH No. 66)

33.8 g of a polyether which has been started on butanol and contains ethylene oxide and propylene oxide segments in proportions of 83:17 (OH No. 30.0)

29.6 g of a propoxylated adduct of 2-butenediol-(1,4) and $NaHSO_3$ 72.3 g of hexamethylene-1,6-diisocyanate 19.3 g of ammonia (25% in water)

1150 g of water 90 g of 30% formaldehyde in water

Method See Example 1

A stable dispersion containing cross-linking agent and having a solids content of 29.1% and an outflow time from a Ford cup (4 mm nozzle) of 12.4 seconds is obtained. The dispersion is suitable for use as primer additive for dressing leather. The proportion of ethylene oxide groups in the solids content is 5.2%. The solids content in addition contains 9.4 m equivalents of $SO_3^{\ominus}$.

EXAMPLE 5

Reaction Mixture 372.0 g of a polyester of phthalic acid, adipic acid and ethylene glycol (PAA) (OH No. 66)

135.0 g of dispersing agent (A)

70.3 g of hexamethylene-1,6-diisocyanate (H)

17.0 g of ethanolamine in 90.0 g of water 870.0 g of water 35.0 g of formaldehyde (30% in water)

Method See Example 1

A dispersion which contains cross-linking agent and is resistant to centrifuging is obtained. It has a solids content of 35.6% and an outflow time of 22 seconds (DIN-cup, 4 mm nozzle). The pH is 4.4. The product is suitable for use as leather primer for dressing leather. The proportion of ethylene oxide units in the solids content is 17.1%, by weight.

EXAMPLE 6

Reaction Mixture 372.0 g of a polyester of phthalic acid, adipic acid and ethylene glycol (PAA) (OH No. 66)

67.5 g of polyester which has been started on butanol and contains ethylene oxide and propylene oxide segments in proportions of 83:17 (OH No. 30.0)

64.3 g of hexamethylene-1,6-diisocyanate 16.3 g of ammonia (25% in water)

1160.0 g of water 90.0 g of formaldehyde (30% in water)

Method See Example 1

A stable dispersion containing cross-linking agent and having a solids content of 27% and an outflow time (DIN-cup/4 mm nozzle) of 11.6 seconds is obtained. The pH is 5.1. The dispersion shows a Tyndall effect in transmitted light. It dries to form clear, transparent films. It is suitable for use as primer additive for dressing leather. The average molecular weight of the isocyanatefree oligomer is 4230. The proportion of ethylene oxide groups in the solids content is 9.8%.

EXAMPLE 7

Reaction Mixture 342 g of a polypropylene oxide ether started on bisphenol A (PA) (molecular weight 570)

45 g of dispersing agent (B) (see Example 2)

156 g of hexamethylene-1,6-diisocyanate 44.3 g of ammonia (25% in water)

1250 g of water 90 g of formaldehyde (30% in water)

Method: See Example 1

A stable dispersion containing cross-linking agent and having a solids content of 25.4% and a Ford cup outflow time (4 mm nozzle) of 11 seconds is obtained. The dispersion is suitable for use as a primer additive for dressing leather. The proportion of ethylene oxide groups in the solids content is 6.81%.

EXAMPLE 8 (A and B according to the present invention, C-N for comparison)

Reaction Mixture 372 g of a polyester of phthalic acid, adipic acid and ethylene glycol (PAA) (OH No. 66)

66.5 g of a polyether which has been started on butanol and contains ethylene oxide and propylene oxide segments in proportions of 83:17 (OH No. 30) (dispersing agent)

64.2 g of hexamethylene-1,6-diisocyanate (H)

15.0 g of ammonia (25% in water)

1150.0 g of water 90.0 g of formaldehyde (30% in water)

Method

The polyester (PAA) and dispersing agent are dehydrated. The diisocyanate (H) is stirred in at 100° C. The reaction mixture is left to react at this temperature until the isocyanate content is constant (about 1.85%).

A. 500 g of the prepolymer are cooled to 50° C., reacted with aqueous ammonia and dispersed in water at 50° C. after 10 minutes. Formaldehyde is stirred in after a further 15 minutes. A stable dispersion containing cross-linking agent is obtained. It shows a Tyndall effect in transmitted light. It has a solid content of 27.6% and a Ford cup outflow time (4 mm nozzle) of 13 seconds. Its pH is 5.5. The ethylene oxide content is 9.7%, by weight. The product is suitable for use as an additive for dressing leather.

B. The prepolymer is cooled to 50° C., reacted with aqueous ammonia and dispersed in water heated to 70° C. after 10 minutes at 70° C. Formaldehyde is stirred in after a further 15 minutes. A dispersion which contains cross-linking agent and is free from sediment is obtained. It shows a Tyndall effect in transmitted light. It has a solids content of 28.2% and a Ford cup outflow time (4 mm nozzle) of 13 seconds. The pH is 5.7.

C. The prepolymer is cooled to 50° C., aqueous ammonia is added and the reaction mixture is dispersed in water at 80° C. after 10 minutes. The product may only be partly dispersed. Most of the solids content forms lumps and threads.

D. The prepolymer is cooled to 85° C. and then vigorously stirred into a mixture of ammonia and water which has been heated to 70° C. The prepolymer may initially be distributed homogeneously, but when about 50% of the prepolymer has been added, the solids content clumps together and adheres to the stirrer.

E. Experiment carried out in the same way as Experiment D, but the mixture of ammonia and water has been heated to 50° C. A suspension which sediments immediately is obtained.

F. The prepolymer is cooled to 50° C. and stirred into a solution of 575 g of water and 15 g of ammonia (25% in water). The remaining 575 g of water are added after about 5 minutes. Formaldehyde is stirred in after a further 5 minutes. The resulting dispersion sediments immediately.

G. The prepolymer is cooled to 50° C. and stirred into a solution of 288 g of water and 15 g of ammonia (25% in water). The prepolymer does not disperse. It is drawn out into threads and forms lumps.

H. The prepolymer is cooled to 50° C. A solution of 15 g of ammonia (25% in water) in the total quantity of water is stirred into the prepolymer. The prepolymer does not disperse, but forms lumps and is drawn out into threads.

I. The same as Experiment H, but the reaction temperature is raised to 90° C. The prepolymer does not disperse, but is drawn into threads and forms lumps.

J. The prepolymer is cooled to 50° C. A solution of 10.6 g of ammonium carbonate in 1150 g of water heated to 50° C. is introduced into the prepolymer. The prepolymer cannot be dispersed, but forms lumps and is drawn into threads.

K. Same as Experiment J, but the ammonium carbonate is dissolved in 575 g of water. The prepolymer cannot be dispersed, but forms lumps and is drawn into threads.

L. The prepolymer is cooled to 50° C. and then stirred into a solution of 10.6 g of ammonium carbonate in 1150 g of water. The prepolymer cannot be dispersed, but forms lumps and is drawn into threads. M. The prepolymer is cooled to 50° C. and then stirred into 25% ammonia solution. The water of dispersion heated to 50° C. is stirred in after 10 minutes. The prepolymer cannot be dispersed. It forms lumps and is drawn into threads.

EXAMPLE 9 (Comparison Example)

The following comparison Example, which is carried out in accordance with Example 1 of U.S. Pat. No. 3,756,992, illustrates that simply replacing the ionic groups according to the prior publication by non-ionic hydrophilic centers is not sufficient on its own to produce a stable aqueous polyurethane dispersion.

Reaction Mixture 500 g of a polyester of phthalic acid, adipic acid, and ethylene glycol (PE) (OH No. 64)
140 g of dispersing agent (B) (DB) (see Example 2)
23.1 g of urea (HS)
101.7 g of tolylene diisocyanate, mixture of isomers 65:35 (T 65)
258 g of formaldehyde (30% in water)
1100 g of water

Method

PE, DB and HS are introduced into the reaction vessel at 60° C. and T 65 is added within 1 minute. The reaction temperature rises exothermically to 85° C. When the reaction mixture has been heated to 120° C., the temperature continues to rise exothermally to 132° C. The melt is stirred at 130° C. for 20 minutes and formaldehyde is then added at 100° C. After 10 minutes stirring at from 95° to 100° C., dropwise addition of water is begun, the the reaction temperature being maintained throughout at about 100° C. When, after about 7 minutes, approximately 120 ml of water has been added, the prepolymer combines with the water to form thick lumps which prevent further stirring. The remainder of the water is then added. Although the inhomogeneous mixture may then be stirred, the lumps cannot be broken down. The experiment is stopped. The ethylene oxide content is 14.6%, by weight.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of aqueous dispersions of polyurethanes which have urea end groups and which contain non-ionic hydrophilic segments and which may be cross-linked by means of cross-linking agents which are reactive with urea groups comprising reacting in a reaction vessel a prepolymer which has isocyanate end groups and which
   (i) has a stoichiometrically calculated average molecular weight of less than about 10,000; and
   (ii) contains from about 2 to 30%, by weight, of ethylene oxide units corresponding to the following formula;

$$-CH_2-CH_2-O-$$

arranged within a polyether chain containing ethylene oxide units, at from about 10° to 70° C. with an aqueous solution of ammonia or with a monoprimary amine, optionally dissolved in water, the aqueous solution of ammonia or the monoprimary amine, optionally dissolved in water, being added to the prepolymer previously introduced into the reaction vessel, the quantity of water used for dissolving the ammonia or primary amine being at the most about 10%, by weight, based on the total quantity of the reaction mixture, and finally, after completion of the addition reaction between the free isocyanate groups of the prepolymer and the added ammonia or monoprimary amine, the desired reaction product is stirred with water at from about 10° to 70° C. to form a from about 5 to 65%, by weight, aqueous dispersion.

2. A process for the production of cross-linked sheets comprising applying the aqueous dispersions or solutions of polyurethanes obtained by the process of claim 1 to a substrate and drying, cross-linking of the resulting sheet being ensured by the addition of a cross-linking agent capable of undergoing a cross-linking reaction with urea groups before, during or after application of the aqueous dispersions to the substrate.

3. The process of claim 2 wherein the cross-linking agent is selected from the group consisting of formaldehyde or melamine resins which have methylol groups.

4. The process of claim 1 wherein the prepolymer which has isocyanate end groups
   (i) has an average molecular weight of less than about 10,000;
   (ii) contains from about 6 to 20% by weight of ethylene oxide units arranged within a polyether chain; and
   (iii) has an isocyanate content of from about 1.5 to 10% by weight.

5. The process of claim 1 wherein the prepolymer is produced by reacting a diisocyanate with a polyhydroxyl compound at an NCO/OH equivalent ratio of from about 1.1:1 to 2.5:1.

6. The process of claim 5 wherein the polyhydroxyl compound corresponds to a compound of the formula

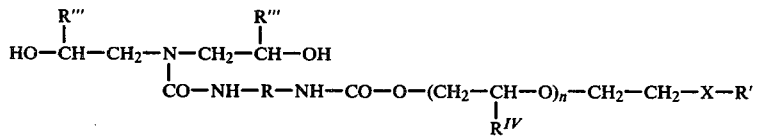

wherein
R represents a divalent group such as is obtained by removal of the isocyanate groups from a diisocyanate having a molecular weight of from about 112 to 1000;
X represents —O— or —NR″—;
R′ and R″ which may be the same or different, each represents a monovalent hydrocarbon group having from 1 to 12 carbon atoms;

R‴ represents hydrogen or a monovalent hydrocarbon group having from 1 to 8 carbon atoms;
n represents an integer of from 4 to 89; and
$R^{IV}$ represents hydrogen or a methyl group.

7. The process of claim 1 wherein the prepolymer which has isocyanate end groups is reacted with the aqueous solution of ammonia or with the primary amine at a temperature of from about 15° to 50° C. and wherein the reactants are chosen so that the reaction mixture contains from about 0.9 to 1.2 molecules of ammonia or of amino groups of the primary amine per each isocyanate group of the prepolymer.

8. The process of claim 1 wherein the reaction product is stirred with water at from about 15° to 50° C. to form a from about 20 to 50% by weight aqueous dispersion.

9. A solvent free process for the preparation of aqueous dispersions of non-ionic polyurethanes containing urea end groups and non-ionic hydrophilic segments comprising
(A) introducing a prepolymer having isocyanate end groups into a reaction vessel, said prepolymer
   (i) having a stoichiometrically calculated average molecular weight of less than about 10,000 and
   (ii) containing from about 2 to 30% by weight of ethylene oxide units corresponding to the formula —CH₂—CH₂—O— arranged within a polyether chain,
(B) adding an aqueous solution of ammonia or a monoprimary amine, optionally dissolved in water, to the reaction vessel to form a reaction mixture, said reaction mixture containing at most about 10% by weight of water and having about 0.9 to 1.2 molecules of ammonia or of amino groups of the primary amine for each isocyanate group;
(C) reacting the reaction mixture at about 10° to 70° C. until the isocyanate addition reaction is complete; and
(D) stirring the reaction product of (C) with water at from about 10° to 70° C. to form an about 5 to 65% by weight aqueous dispersion of polyurethane.

* * * * *